United States Patent
Chandler et al.

(10) Patent No.: US 6,433,478 B1
(45) Date of Patent: Aug. 13, 2002

(54) HIGH FREQUENCY ELECTRODELESS COMPACT FLUORESCENT LAMP

(75) Inventors: Robert Chandler, Lexington; Oleg Popov, Needham; Edward K. Shapiro, Lexington; Jakob Maya, Brookline, all of MA (US)

(73) Assignees: Matsushita Electric Industrial Co., Ltd.; Matsushita Electric Works, Ltd., both of Osaka (JP)

( * ) Notice: Subject to any disclaimer, the term of this patent is extended or adjusted under 35 U.S.C. 154(b) by 0 days.

(21) Appl. No.: 09/435,960

(22) Filed: Nov. 9, 1999

(51) Int. Cl.[7] .............................. H01J 1/62; H01J 63/04
(52) U.S. Cl. ..................... 313/607; 313/27; 313/45; 313/46; 313/47; 313/234; 315/248
(58) Field of Search ............................. 313/46, 45, 47, 313/27, 607, 234; 315/248

(56) References Cited

U.S. PATENT DOCUMENTS

| | | | |
|---|---|---|---|
| 3,987,334 A | * 10/1976 | Anderson | 315/57 |
| 4,298,828 A | * 11/1981 | Justice et al. | 315/248 |
| 4,357,559 A | * 11/1982 | Piper | 315/248 |
| 4,536,675 A | 8/1985 | Postma | 313/46 |
| 4,661,746 A | * 4/1987 | Postma et al. | 315/248 |
| 5,343,126 A | 8/1994 | Farall et al. | 315/248 |
| 5,801,493 A | 9/1998 | Antonis et al. | 314/248 |
| 5,808,414 A | 9/1998 | Wharmby et al. | 313/607 |
| 6,081,070 A | 6/2000 | Popov et al. | 313/490 |
| 6,124,679 A | * 9/2000 | Vrionis | 315/248 |

OTHER PUBLICATIONS

U.S. patent application Ser. No, 09/303,951, Chamberlain et al., May 5, 1999.

* cited by examiner

Primary Examiner—Michael H. Day
Assistant Examiner—Glenn Zimmerman
(74) Attorney, Agent, or Firm—Kinney & Lange, P.A.

(57) ABSTRACT

An electrodeless compact fluorescent lamp operated at a frequency from 50 KHz to 1000 KHz and RF power from 10 W to 40 W is described. The lamp includes a bulbous glass envelope (1) filled with rare gas and metal vapor, reentrant glass cavity (2), an induction coil (6) made from Litz wire, a ferrite assembly comprising a ferrite core (7) and MnZn ferrite disk (11), a cooling structure comprising a metal (or ceramic) tube (8) positioned inside the ferrite core (7) and a metal (or ceramic) unit (9) that transmits the heat from the cavity and ferrite assembly to the Edison socket (10), a thermal shield (12), and a driver and matching network located inside the lamp base (13). A protective coating (15) and phosphor coating (16) are coated on the inner surface of the envelope (1) and reentrant cavity (2). The reflective coating (17) made from alumina is coated on the inner surface of the cavity (2) and on the outer surface of the envelope bottom (4). The mercury pressure is controlled in the envelope by the temperature of the amalgam (5) positioned in the tubulation (3) or by the temperature of pure mercury located in the cold spot.

24 Claims, 5 Drawing Sheets

HIGH FREQUENCY ELECTRODELESS COMPACT FLUORESCENT LAMP

FIELD OF THE INVENTION

The invention relates to electric lamps and, more specifically, to electrodeless fluorescent lamps operated at low and intermediate pressures at frequencies from 20 KHz to 1 MHz.

BACKGROUND OF THE INVENTION

Electrodeless fluorescent lamps have been recently introduced in markets for indoor, outdoor, industrial, and commercial applications. The advantage of electrodeless lamps is the removal of internal electrodes and heating filaments that are a life-limiting factor of conventional fluorescent lamps. Therefore, the life of electrodeless fluorescent lamps is substantially higher than that of conventional fluorescent lamps and can reach 100,000 hrs.

An electrodeless fluorescent lamp introduced in the market by General Electric Corp. (under the trademark GENURA) is operated at a frequency of 2.65 MHz and used for indoor general lighting. This lamp is a replacement for the R30 incandescent lamp and has 1,100 lumen light output at 23 W of total power. The life of GENURA lamps, 15,000 hours, is much larger than that of incandescent lamps. The drawback of GENURA lamps is the high initial cost, partially due to the need to prevent electromagnetic interference and partially due to the circuit cost in operating at 2.65 MHz. Both drawbacks could be diminished if the electrodeless fluorescent lamp was operated at lower frequencies, as low as 100 KHz.

In U.S. Pat. No. 6,081,070 by Popov et al. and in U.S. patent application Ser. No.09/303,951 by Chamberlain et al. (having the same assignee as the present application) electrodeless fluorescent lamps operated at low frequencies from 50 KHz to 500 KHz were described. Those lamps utilized a ferrite core made from MnZn material, Litz wire, and an aluminum cooling structure that removed heat from the reentry cavity walls and the ferrite core and redirected that heat to the lamp fixture. The aluminum cooling structure comprises an aluminum cylinder insider the ferrite core and an aluminum base welded to the lamp fixture. This approach and construction were found to be very effective to keep the ferrite core at temperatures below its material Curie point.

However, in many lamp applications (e.g. the replacement of a conventional incandescent lamp) the large and heavy metal (aluminum or copper) base is not suitable due to its large size and weight. Also, the replacement. of the incandescent lamp requires the use of Edison socket that should be coupled with the base. Again, the diameter of the lamp base should not be larger than the diameter of the incandescent lamp bulb that is 60 mm.

The proximity of ferrite core to the metal base causes the interference of the magnetic field with the metal base that results in the increase of the coil/ferrite core power losses. Indeed, the magnetic field generated by the coil induces eddy currents in the metal base that causes power losses and reduces the combined coil/structure quality factor, Q. As a result, the lamp power efficiency and hence, efficacy decreases.

The need for the incorporation of the lamp driver and lamp matching network inside the lamp base and to couple them with the Edison socket makes the cooling issue more complex. Indeed, the temperature inside of the lamp base should not exceed ~100° C. to provide integrity of the driver's components. The use of components that can stand higher temperatures leads to higher cost of the driver and hence, the lamp.

SUMMARY OF THE INVENTION

The present invention comprises an electrode-less fluorescent lamp that includes a glass envelope containing a fill of inert gas with mercury vapor. A ferrite core and an induction coil made from Litz wire are positioned inside of the reentrant cavity. A cooling structure comprises a metal (aluminum, copper) tube placed inside of the cavity and a ceramic spacer that is glued to the Edison socket with material having high thermal conductivity.

An objective of the present invention is to provide a cooling structure that keeps the ferrite core temperature below Curie point.

Another objective of the present invention is to provide low temperatures, T<100° C., inside of the lamp base where the driver and matching network are placed.

A further objective of the present invention is to provide low power losses in the cooling structure and in the lamp base so to provide a high lamp power efficiency and efficacy.

Yet another objective of the present invention is to design a coil that has high quality factor at the frequency as low as 100 KHz so as to provide low coil power losses and high lamp power efficiency.

An additional objective of the present invention is to provide an electrodeless fluorescent lamp that can operate at 100 KHz that results in overall low cost system.

DESCRIPTION OF THE PREFERRED EMBODIMENTS

Figure 1:
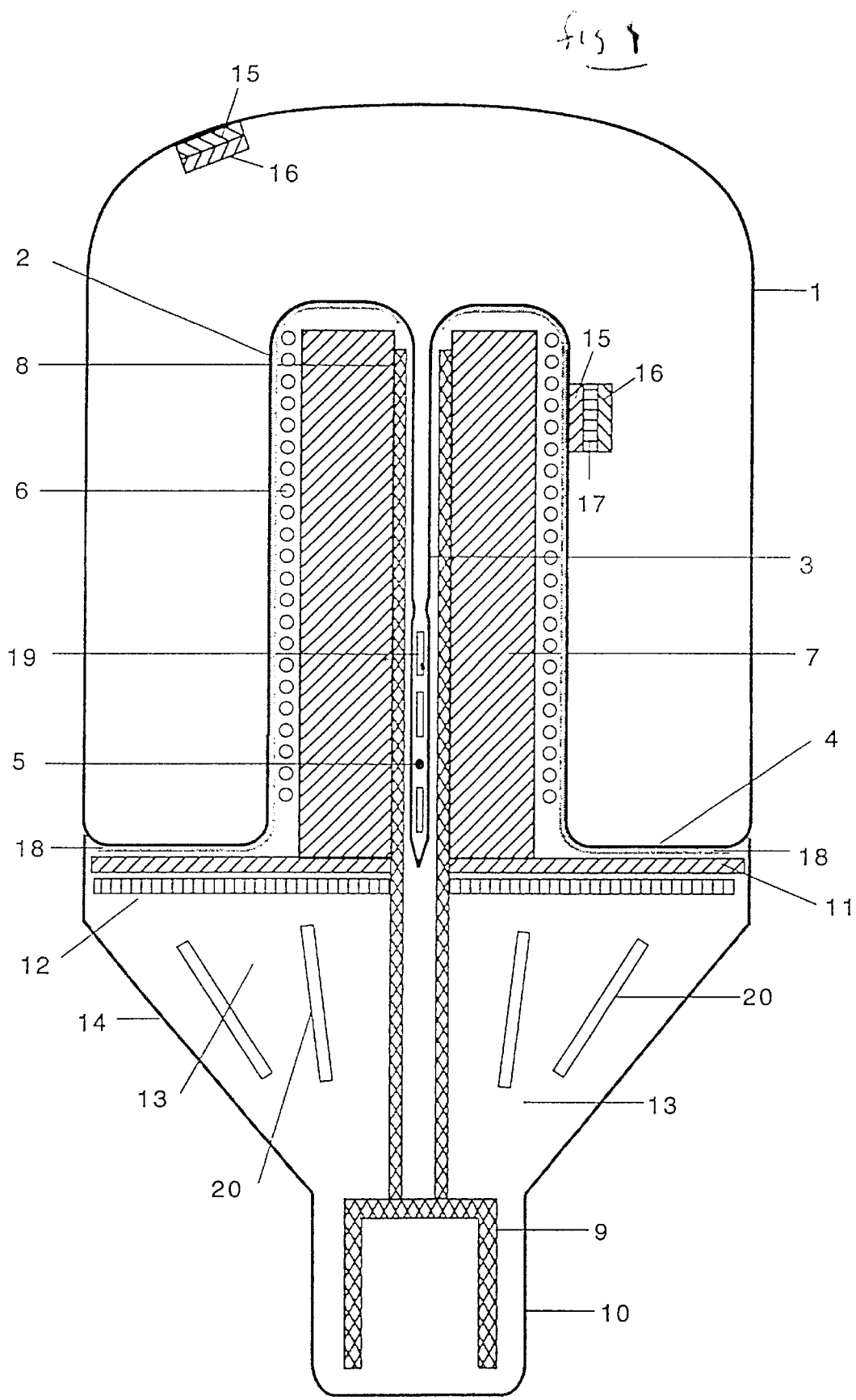
FIG. 1 is a cross-sectional view of a first embodiment of the present invention showing the electrodeless compact fluorescent lamp with the copper tube and the copper cylinder.

Referring to FIG. 1, a bulbous envelope 1 made from the glass has a re-entry cavity 2 with an exhausting tubulation 3 located inside the cavity 2 on its axis (or possibly off-axis). The tubulation 3 extends from the envelope bottom 4. The fill inert gas (argon, krypton, or the like) is at pres sure from 0.1 torr to 5 torr.

A mercury amalgam (or mercury dispenser) 5 is positioned in the tubulation 3 and controls the mercury vapor pressure in the envelope. A coil 6 made from multiple strand wire (Litz wire) is wound around a ferrite core 7. The ferrite core 7 was made from MnZn material (see U.S. patent application Ser. No. 09/303,951 by Chamberlain et al.) and is disposed in the re-entry cavity 2. The coil 6 and ferrite core 7 are maintained at temperatures below Curie point (<220° C.) with the help of a cooling structure made from the metal with high thermal conductivity and low RF power losses (low eddy currents) such as aluminum, copper, or the like. The cooling assembly comprises a narrow tube 8 positioned inside a ferrite core 7 and the cylinder 9 located inside the Edison socket 10 and having the outer diameter close to that of the inner diameter of Edison socket 10.

To minimize the effect of the metal tube on the coil/ferrite inductance the top edge of the metal tube was positioned inside of the ferrite core where the magnetic field does not have radial and azimuthal components. The tube 8 and cylinder 9 are welded to each other or made from a single piece. Thus, the heat from the ferrite core 7 and cavity walls 2 is transferred via the tube 8 to the cylinder 9 and then dumped to the Edison socket 10.

The ferrite plate 11 increases the coil/ferrite effective permeability, $\mu_{eff}$, and the coil/ferrite inductance, $L_c$, that results in the increase of the coil/ferrite quality factor, Q (Q=550 at f=100 KHz), and in the decrease of the coil/ferrite power losses, $P_{loss}$. Consequently, the lamp has high power efficiency, $\eta = P_{pf}/P_{lamp} = P_{lamp} - P_{loss}$, $P_{lamp}$, and high efficacy.

The thermal shield 12 made from non-metallic material and having low thermal conductivity (e.g. Xydar, or the like) thermally insulates the area 13 from the ferrite core 7 and the ferrite disk 11. The area 13 is used for the disposal of the lamp driver and the matching network (not shown) and is kept at temperature below 100° C. The enclosure 14 made from non-metallic material (e.g. plastic) is glued to the lamp bottom 4 and to the Edison socket 10. The protective and phosphor coatings 15 and 16 are disposed on the inner surfaces of the envelope 1 and the re-entry cavity 2. The reflective coating 17 (alumina or the like) is disposed on the inner surface of the bottom 4 of the envelope 1 and on the inner surface of the cavity 2. To minimize visible light losses via the bottom 4 and the cavity walls 2 the outer surface of the bottom 4 and the walls 2 are coated with the reflective coating 18 (alumina or the like). A few glass rods 19 are used to position the amalgam 5 inside the tubulation 3. (When the lamp is operated without amalgam, no glass rods are used.) To reduce temperature inside the area 13 where the driver and matching network are located a few slits 20 were made in the enclosure 14.

Figure 2:
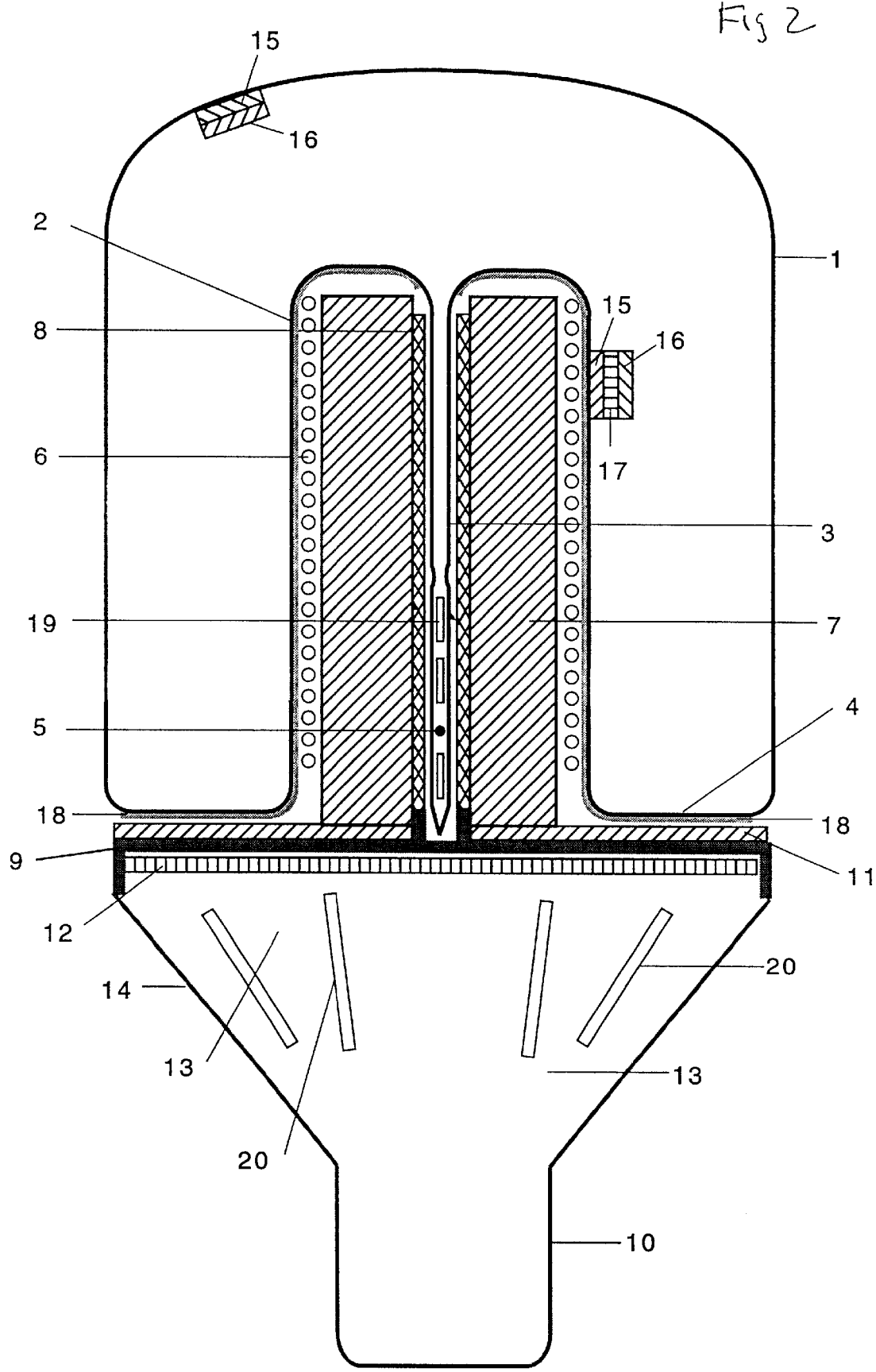
FIG. 2 is a cross-sectional view of a second embodiment of the present invention showing the electrodeless compact fluorescent lamp with the copper tube and the ceramic "skirt".

The second embodiment of the present invention is shown in FIG. 2. The cooling arrangement comprises a tube 8 made from material of high thermal conductivity such as alumina, copper, aluminum or the like and a ceramic "skirt" 9 having high thermal conductivity (aluminum oxide, aluminum carbide, or the like). The whole cooling structure could be also made from the single piece of ceramic. The use of the metal with high thermal conductivity such as copper or aluminum is not desirable due to high losses caused by eddy currents.

The heat from the ferrite core 7 and the cavity walls 2 is transferred via the tube 8 to the ceramic 9 and then is removed via convection to ambient atmosphere. The insulating shield 12 made from the material with low thermal conductivity also helps to reduce heat transfer to the driver area 13 and keeps the temperature in this area below about 100° C.

In order to further reduce the temperature of the electronic components in the area 13, slits 20 may be added to the housing unit 14. This however, could be considered optional depending on the lamp operation environment.

Figure 3:
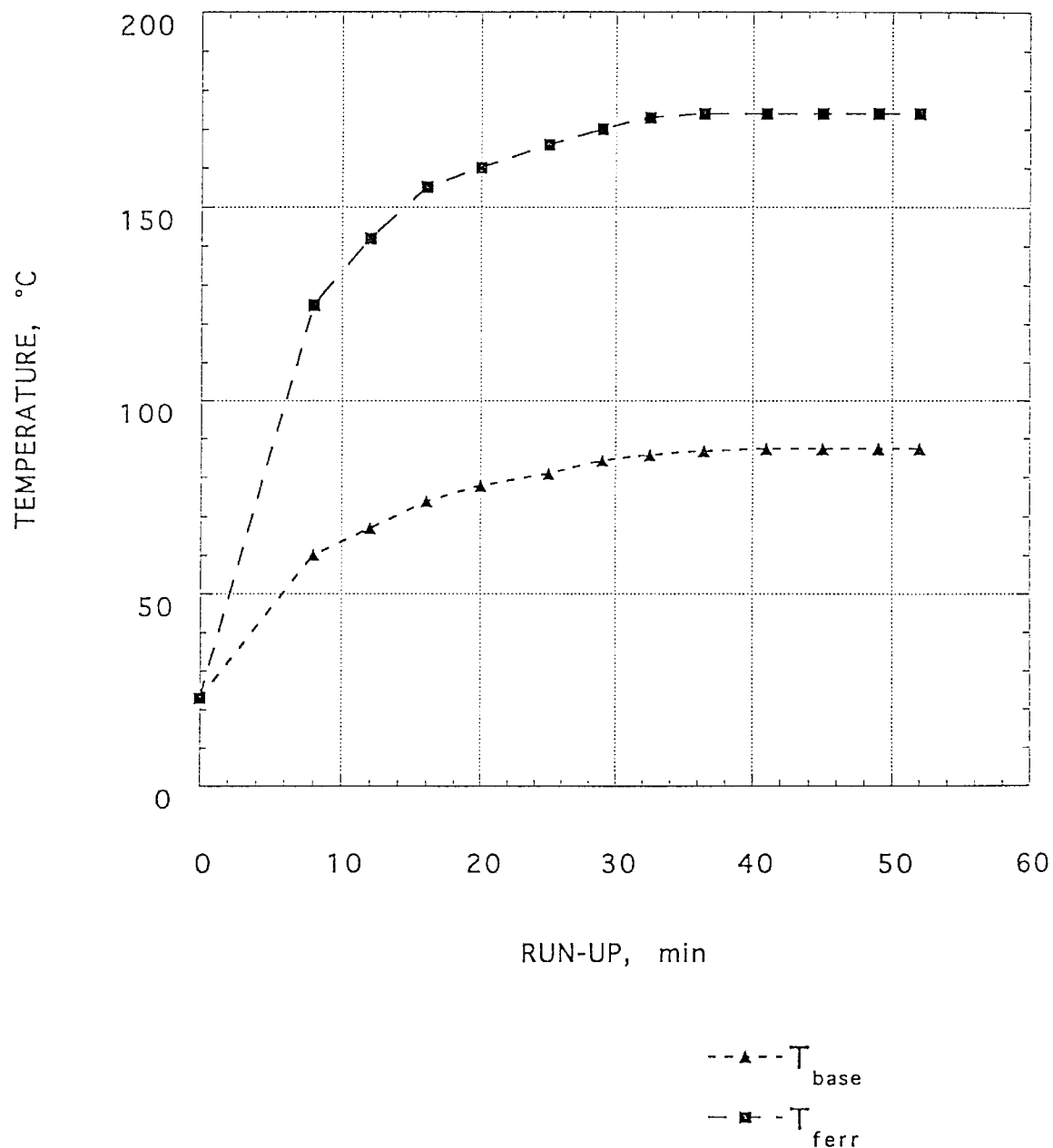
FIG. 3 is a graph showing the run-up temperatures of the ferrite core and the area in the base where the driver is located.

The temperatures of the ferrite core 7, $T_{ferr}$ and inside the area 13, near the insulating shield 12, $T_{base}$ are given in FIG. 3 as functions of the lamp run-up time for the driving frequency of 95 KHz and RF power of 23 W. It is seen that after about 35 min. of operation both temperatures stop to grow. The stabilized temperature of the ferrite core 7 is around 185° C. that is substantially lower than Curie point of 220° C. Even if the ambient temperature is 40° C. the ferrite temperature is still below 220° C. The stabilized temperature inside the area 13 is about 85° C. so at ambient temperature of 40° C. Tbase is still lower than 100° C.

The lamp is operated as follows. The envelope is filled with argon at pressures from 0.1 to 3.0 Torr dependent on the envelope diameter and length. The mercury vapor pressure in the envelope is controlled by the temperature of the amalgam (or mercury cold spot) 5. The 60 Hz line voltage (100 V or 220 V) is applied to the driver located in the area 13. The high frequency voltage is generated by the driver and applied to the coil 6 via the matching network. The capacitive discharge with low plasma density is ignited at coil voltage around 150–200 V.

When the coil voltage reaches the magnitude that is high enough to maintain in the envelope a self-sustained inductively coupled discharge, the bright discharge appears in the envelope that is accompanied with the decrease of both coil current and voltage. This is the starting of the lamp. The magnitudes of the coil starting voltage and current are determined by the coil number of turns, gas/mercury vapor pressure in the envelope and the envelope geometry.

In the preferred embodiments 1 and 2 the inert gas (argon) pressure in the envelope 1 was about 1 torr. The envelope diameter is 60 mm and the envelope length is 62 mm. The induction coil 6 has 60 turns wound in two layers. The lamp starting voltage was 1000 V rms. The coil voltage and current, $V_m$ and $I_m$, needed to maintain the inductively coupled discharge decrease as RF power grows. For the coil with 60 turns the typical coil maintaining voltage $V_m$ varied from 480 V at 15 W to 350 V at 40 W and the coil current $I_m$ varied from 2.3 A (15 W) to 1.6 A (40 W).

The lamp power efficiency during the lamp operation depends on the coil and ferrite core power losses, $P_{loss}$. The power losses measured in the lamp shown in FIG. 1 (the first embodiment) are plotted as functions of the lamp power, $P_{lamp}$, in FIG. 4 for three driving frequencies: 101 KHz, 135 KHz and 170 KHz. The power losses were determined as the difference between the lamp forward power, $P_f$, and reflected power, $P_{ref}$, measured for the coil current $I_m$ but in the absence of the RF discharge in the lamp.

Figure 4:
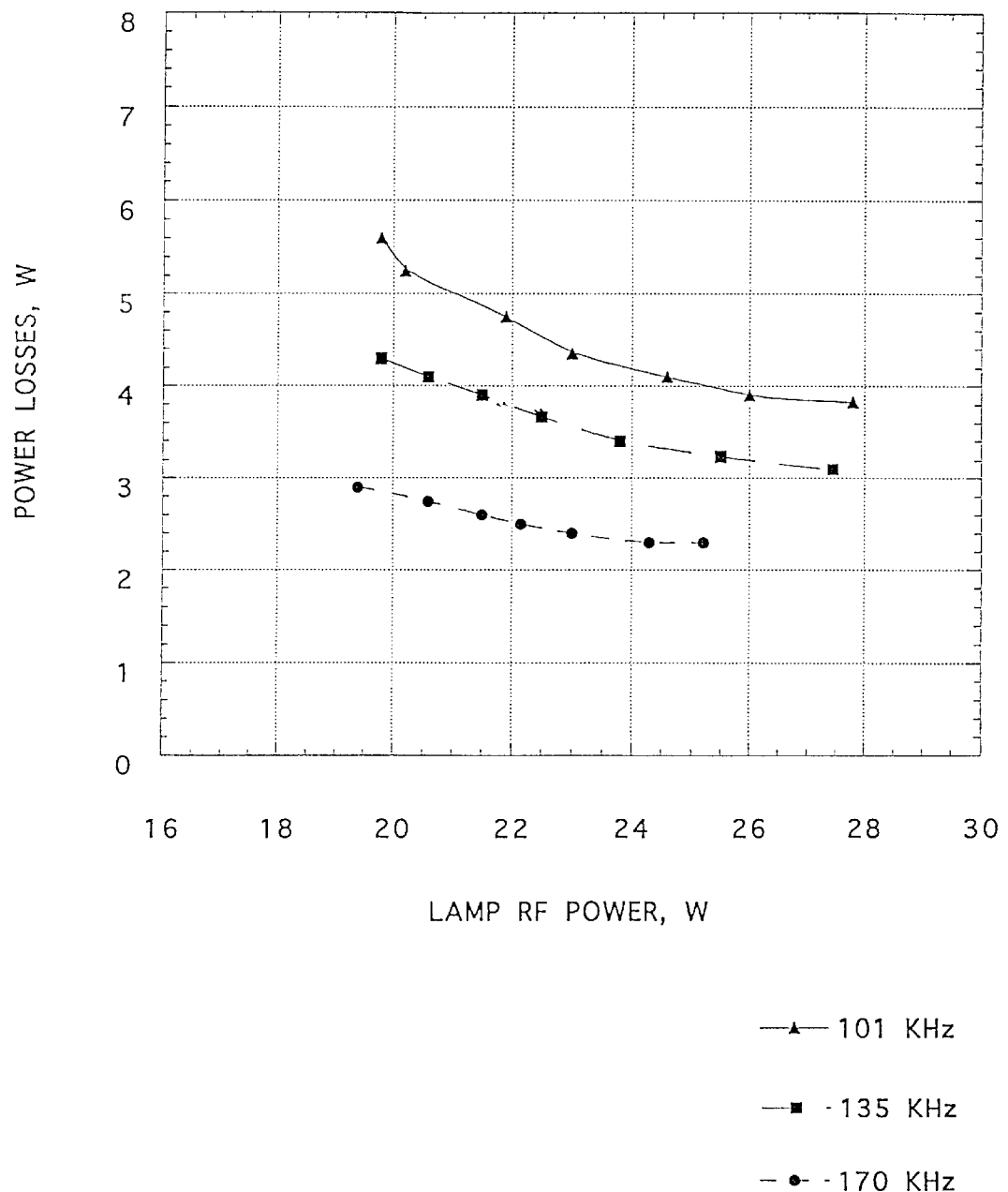
FIG. 4 is a graph showing coil/ferrite power losses as a function of the total lamp power for three driving frequencies: 101 KHz, 135 KHz, and 170 KHz. The cooling structures as is shown in FIG. 1.
Figure 5:
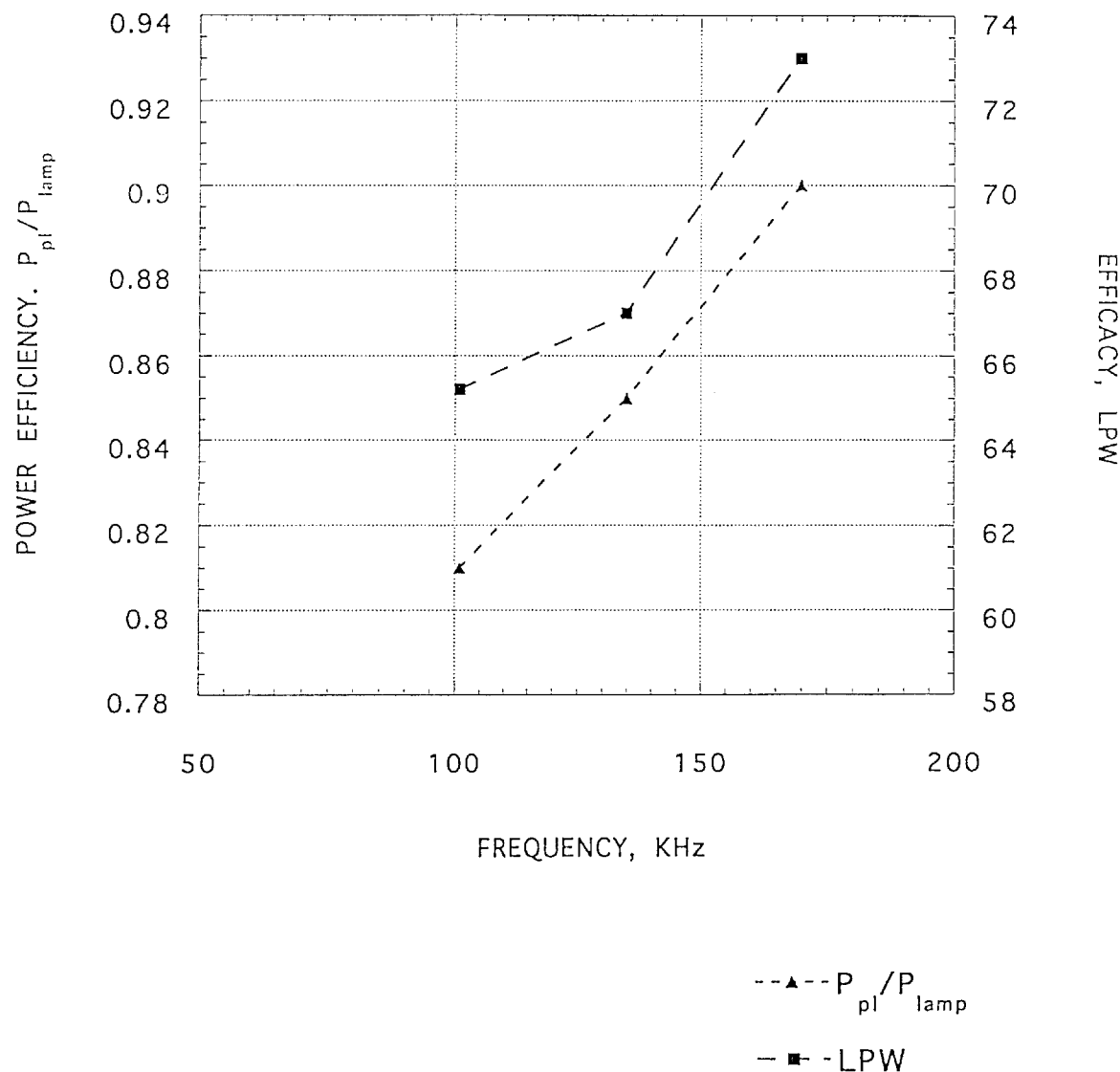
FIG. 5 is a graph showing the lamp power efficiency and efficacy as functions of driving frequency for the cooling structure shown in FIG. 1, the RF power being 23 W.

It is seen from FIG. 4 that as the lamp RF power increases, the coil/ferrite power losses, $P_{loss}$ decreases. For instance, for the frequency of 100 KHz, the power losses decreases from 6.2 W at $P_{lamp}$=19.5 W to 3.8 W at $P_{lamp}$=26 W. The increase of the driving frequency leads to lower coil/ferrite power losses. For instance, at the frequency of 170 KHz and the lamps RF power of 23 W, the coil/ferrite power losses are 2.4 W. The decrease of $P_{loss}$ at higher frequencies results in higher lamp power efficiency, $\eta = P_{pf}/P_{lamp}$. The lamp power efficiency, $\eta$ and the lamp efficacy (LPW) are shown in FIG. 5 as functions of the driving frequency, f, for the lamp described in FIG. 1 (the first embodiment) and operated at lamp RF power of 23 W. It is seen that $\eta$ increases as the driving frequency increases from 0.81 at f=100 KHz to 0.9 at f=170 KHz. It is expected that the lamp efficacy also increases with the driving frequency. Indeed, as it is shown in FIG. 5 the lamp efficacy increases from 65 LPW at f=100 KHz to 73 LPW at f=170 KHz.

It should be mentioned here that the efficacy of the lamp described in the present invention and operated at the frequency as low as 100 KHz is higher than that of GENURA electrodeless fluorescent lamps operated at the same RF power but at substantially higher driving frequency of 2.65 MHz.

While it is apparent that change and modifications can be made within the spirit and scope of the present invention, it is our intention, however, only to be limited by the appended claims.

As our invention we claim:

1. An electrodeless fluorescent lamp comprising:
   a bulbous glass envelope with a reentrant cavity in said envelope having an inert gas and a vaporizable metal material in said envelope, and a phosphor coating on the inner surface of walls of said envelope and said reentrant cavity;
   a hollow enclosure affixed to the bottom of said envelope at one end of said enclosure and to an Edison base at another end thereof;
   induction coil disposed in said reentrant cavity, said coil for generating an electromagnetic field to form a plasma in said envelope to produce radiation to excite said phosphor to thereby provide visible light;
   a ferrite unit including MnZn material in and adjacent to said reentrant cavity and said induction coil;
   a cooling structure having a metal tube inside a portion of said ferrite unit and a heat transmitting unit adjacent said tube positioned inside said enclosure and said Edison base to transmit heat from said ferrite unit to said Edison base;
   an insulation unit separating said ferrite unit from at least a portion of said enclosure; and
   a lamp driver and a matching network located inside said enclosure.

2. The electrodeless lamp according to claim 1 wherein said ferrite unit comprises a ferrite hollow core positioned inside said reentrant cavity, and a flat ferrite disk thermally coupled with said ferrite hollow core and positioned adjacent an end of said reentrant cavity.

3. The electrodeless lamp according to claim 2 wherein said ferrite hollow core has an extent between 10 mm and 200 mm.

4. The electrodeless lamp according to claim 2 wherein said ferrite hollow core has an outer diameter between 5 mm and 60 mm.

5. The electrodeless lamp according to claim 2 wherein said ferrite hollow core has an inner diameter between 3 mm and 30 mm.

6. The electrodeless lamp according to claim 2 wherein said ferrite hollow core has a wall shape substantially in that form exhibited by an I-beam viewed in cross section and has protrusions to the side of said ferrite hollow core that are between 0.1 mm and 5 mm.

7. The electrodeless lamp according to claim 2 wherein said flat ferrite disk has a thickness between 0.5 mm and 10 mm.

8. The electrodeless lamp according to claim 2 wherein said flat ferrite disk has a diameter between 10 mm and 200 mm.

9. The electrodeless lamp according to claim 1 wherein said heat transmitting unit is made from a metal material having a relatively high thermal conductivity and which exhibits relatively low eddy currents.

10. The electrodeless lamp according to claim 9 wherein said ferrite unit comprises a ferrite hollow core positioned inside said reentrant cavity and wherein an end of said tube is within said ferrite core set back from an end thereof.

11. The electrodeless lamp according to claim 9 wherein said heat transmitting unit has a hollow cylinder thermally coupled to said tube having an average outer diameter smaller than the average inner diameter of said Edison base to provide substantial thermal coupling therebetween.

12. The electrodeless lamp according to claim 11 wherein said hollow cylinder has a helical screw thread matching the helical screw thread of the Edison base such that said hollow cylinder can be threaded into the Edison base.

13. The electrodeless lamp according to claim 11 wherein said heat transmitting unit has a wall thickness between 0.5 mm and 10 mm.

14. The electrodeless lamp according to claim 10 wherein an opposite end of said tube is also within said ferrite core set back from an end thereof.

15. The electrodeless lamp according to claim 1 wherein said heat transmitting unit is made from a ceramic material with a relatively high thermal conductivity.

16. The electrodeless lamp according to claim 15 wherein said ferrite unit comprises a ferrite hollow core positioned inside said reentrant cavity, and a flat ferrite disk thermally coupled with said ferrite hollow core and positioned adjacent an end of said reentrant cavity and wherein said heat transmitting unit is positioned adjacent said flat ferrite disk on a side thereof opposite said reentrant cavity.

17. The electrodeless lamp according to claim 15 wherein said heat transmitting unit has a disk portion with a thickness between 0.5 mm and 15 mm.

18. The electrodeless lamp according to claim 17 wherein said heat transmitting unit disk portion has a diameter between 10 mm and 200 mm.

19. The electrodeless lamp according to claim 15 wherein said heat transmitting unit has at least apportion thereof with a shape of a truncated hollow cylinder, said hollow cylinder having the ratio of its length to its outer diameter between 0.1 and 10.

20. The electrodeless lamp according to claim 19 wherein said hollow cylinder has a wall thickness between 0.5 mm and 5 mm.

21. The electrodeless lamp according to claim 15 wherein said heat transmitting unit has at least a portion thereof with substantially a shape of a truncated cylinder capped at one end by an end disk positioned adjacent to the reentrant cavity.

22. The electrodeless lamp according to claim 1 wherein said enclosure has several axial slits in walls thereof, and said slits have a width between 1 mm and 5 mm and a length between 5 mm and 50 mm.

23. The electrodeless lamp according to claim 1 wherein the induction coil is made from Litz wire.

24. The electrodeless lamp according to claim 1 wherein the insulation unit keeps the portion of said enclosure separated from the ferrite unit at a temperature below 100° C.

* * * * *

UNITED STATES PATENT AND TRADEMARK OFFICE
CERTIFICATE OF CORRECTION

PATENT NO.    : 6,433,478 B1
DATED         : August 13, 2002
INVENTOR(S)   : Robert Chandler et al.

It is certified that error appears in the above-identified patent and that said Letters Patent is hereby corrected as shown below:

Column 5,
Line 19, insert -- an --, before the word "induction"

Signed and Sealed this

Eighteenth Day of March, 2003

JAMES E. ROGAN
*Director of the United States Patent and Trademark Office*